US010573956B2

(12) United States Patent
Ma et al.

(10) Patent No.: US 10,573,956 B2
(45) Date of Patent: Feb. 25, 2020

(54) MOBILE DEVICE

(71) Applicant: Acer Incorporated, New Taipei (TW)

(72) Inventors: Pei-Chi Ma, New Taipei (TW);
Hsien-Chang Lin, New Taipei (TW);
Hsin-Wu Chiang, New Taipei (TW);
Wan-Chu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/986,826

(22) Filed: May 23, 2018

(65) Prior Publication Data
US 2019/0140341 A1 May 9, 2019

(30) Foreign Application Priority Data

Nov. 9, 2017 (TW) .............................. 106138763 A

(51) Int. Cl.
H01Q 1/24 (2006.01)
H01Q 1/52 (2006.01)
H04B 1/40 (2015.01)
H01Q 1/22 (2006.01)
H01Q 1/38 (2006.01)
(Continued)

(52) U.S. Cl.
CPC .......... H01Q 1/243 (2013.01); H01Q 1/2291 (2013.01); H01Q 1/38 (2013.01); H01Q 1/521 (2013.01); H01Q 9/42 (2013.01); H01Q 21/28 (2013.01); H04B 1/40 (2013.01)

(58) Field of Classification Search
CPC .......... H01Q 1/243; H01Q 1/521; H01Q 9/42; H01Q 21/28; H01Q 1/38; H01Q 1/2291; H04B 1/40
See application file for complete search history.

(56) References Cited

U.S. PATENT DOCUMENTS

2009/0002243 A1* 1/2009 Dahlstrom ............. H01Q 1/243
                                                          343/702
2009/0322639 A1   12/2009 Lai
(Continued)

FOREIGN PATENT DOCUMENTS

CN      102934283      2/2013
TW      201001800      1/2010
(Continued)

Primary Examiner — Hai V Tran
Assistant Examiner — Michael M Bouizza
(74) Attorney, Agent, or Firm — JCIPRNET

(57) ABSTRACT

A mobile device includes a carrying element, a first antenna, a second antenna, a connection element, and an extension element. The first antenna and the second antenna are disposed on the carrying element. The first antenna operates in a first frequency band through a first resonance path. The second antenna operates in the first frequency band through a second resonance path. The connection element is electrically connected to the first antenna and the second antenna. The connection element, the first antenna and the second antenna form a connection path, and the connection path, the first resonance path and the second resonance path do not overlap one another. The extension element is electrically connected to the connection element. The extension element, the connection element and the first antenna form a third resonance path, and the first antenna operates in a second frequency band through the third resonance path.

9 Claims, 5 Drawing Sheets

(51) Int. Cl.
*H01Q 21/28* (2006.01)
*H01Q 9/42* (2006.01)

(56) References Cited

U.S. PATENT DOCUMENTS

| | | |
|---|---|---|
| 2011/0050528 A1 | 3/2011 | Montgomery |
| 2011/0199267 A1 | 8/2011 | Hayashi |
| 2012/0013519 A1 | 1/2012 | Hakansson et al. |
| 2012/0127038 A1 | 5/2012 | Kim et al. |
| 2013/0069842 A1 | 3/2013 | Lee et al. |
| 2017/0317419 A1* | 11/2017 | Wu ................... H01Q 1/521 |

FOREIGN PATENT DOCUMENTS

| | | |
|---|---|---|
| TW | I478443 | 3/2015 |
| TW | 201739105 | 11/2017 |

* cited by examiner

MOBILE DEVICE

CROSS-REFERENCE TO RELATED APPLICATION

This application claims the priority benefit of Taiwan application serial no. 106138763, filed on Nov. 9, 2017. The entirety of the above-mentioned patent application is hereby incorporated by reference herein and made a part of this specification.

BACKGROUND

Field of the Invention

The invention relates to a mobile device and more particularly, to a mobile device with a first antenna and a second antenna.

Description of Related Art

Along with fast development of technologies, various mobile devices, e.g., smart bicycle watches, have been continuously launched. Generally, a mobile device is equipped with a global positioning system (GPS) antenna and a WiFi antenna, thereby executing a navigation and positioning function and a wireless communication function. However, in a condition that a limited hardware space of the mobile device is limited, the currently existing mobile device is usually unable to be additionally equipped with the second WiFi antenna and as a result, fails to support a multi-input multi-output (MIMO) technique. In addition, in the condition of the limited hardware space, radiation characteristics of an antenna is subject to the affection from electronic elements in the mobile device, which leads to the reduction of communication quality of the mobile device.

SUMMARY

The invention provides a mobile device in which a connection element and an extension element are disposed between a first antenna and a second antenna. Thereby, the mobile device may support a multiple-input multiple-output (MIMO) technique by using the first antenna and the second antenna, and the extension element may contribute to enhancing communication quality of the mobile device.

A mobile device of the invention includes a carrying element, a first antenna, a second antenna, a connection element, and an extension element. The first antenna is disposed on the carrying element and has a first feeding point, a first ground point and a first open-circuit terminal. The first antenna operates in a first frequency band through a first resonance path extending from the first feeding point to the first open-circuit terminal. The second antenna is disposed on the carrying element and has a second feeding point, a second ground point and a second open-circuit terminal. The second antenna operates in the first frequency band through a second resonance path extending from the second feeding point to the second open-circuit terminal. The connection element is electrically connected to the first antenna and the second antenna. The connection element, the first antenna and the second antenna form a connection path extending from the first ground point to the second ground point, and the connection path, the first resonance path and the second resonance path do not overlap one another. The extension element is electrically connected to the connection element and includes a third open-circuit terminal. The extension element, the connection element and the first antenna form a third resonance path extending from the first ground point to the third open-circuit terminal, and the first antenna operates in a second frequency band through the third resonance path.

To sum up, the mobile device of the invention can operate in the first frequency band through the first antenna and the second antenna, and the first antenna, with the connection element and the extension element, can form the third resonance path, so as to operate in the second frequency band. Thereby, the mobile device can support a multiple-input multiple-output (MIMO) technique by using the first antenna and the second antenna, and the extension element can contribute to enhancing communication quality of the mobile device.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
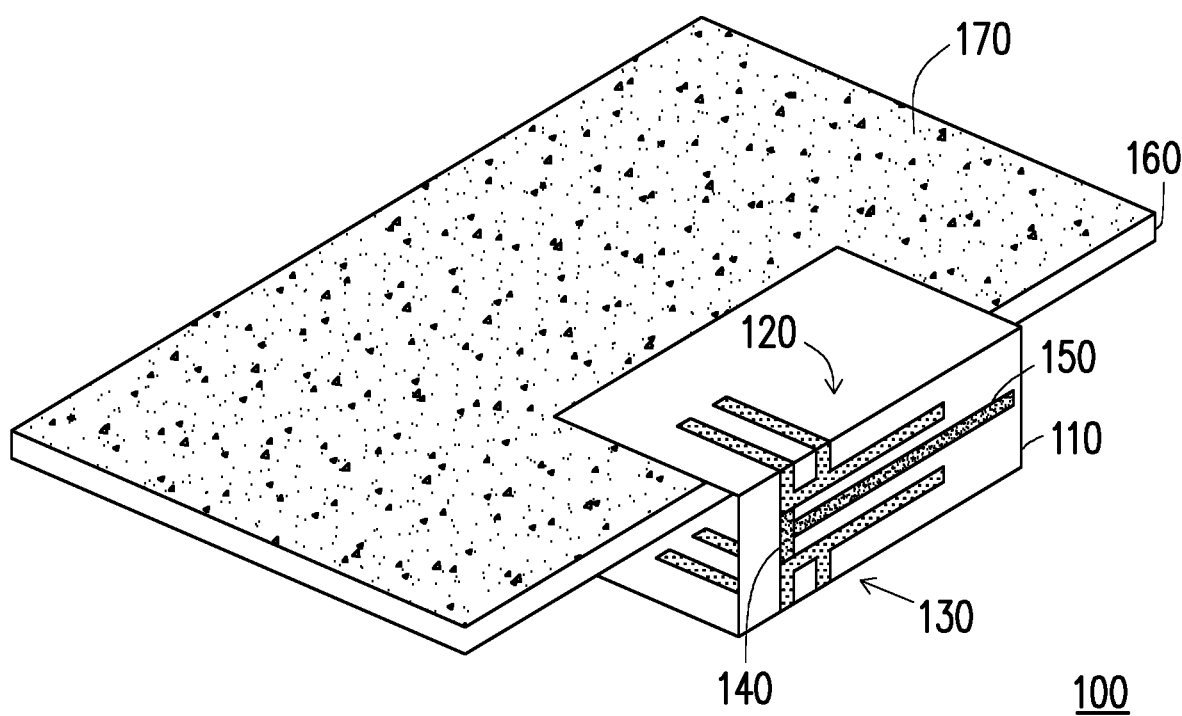
FIG. 1 is a schematic diagram illustrating a mobile device according to an embodiment of the invention.

FIG. 1 is a schematic diagram illustrating a mobile device according to an embodiment of the invention. Referring to FIG. 1, a mobile device 100 includes a carrying element 110, a first antenna 120, a second antenna 130, a connection element 140, an extension element 150 and a substrate 160. The first antenna 120, the second antenna 130, the connection element 140 and the extension element 150 are disposed on the carrying element 110, and a ground plane 170 is disposed on the substrate 160. The carrying element 110 may be formed by a plastic case of the mobile device 100, and the substrate 160 may be disposed in the plastic case of the mobile device 100. In an embodiment, the mobile device 100 may be, for example, a smart bicycle watch, a smart phone or a tablet computer, and the first antenna 120, the second antenna 130, the connection element 140 and the extension element 150 may be disposed on an inner wall of the case of the mobile device.

Figure 2:
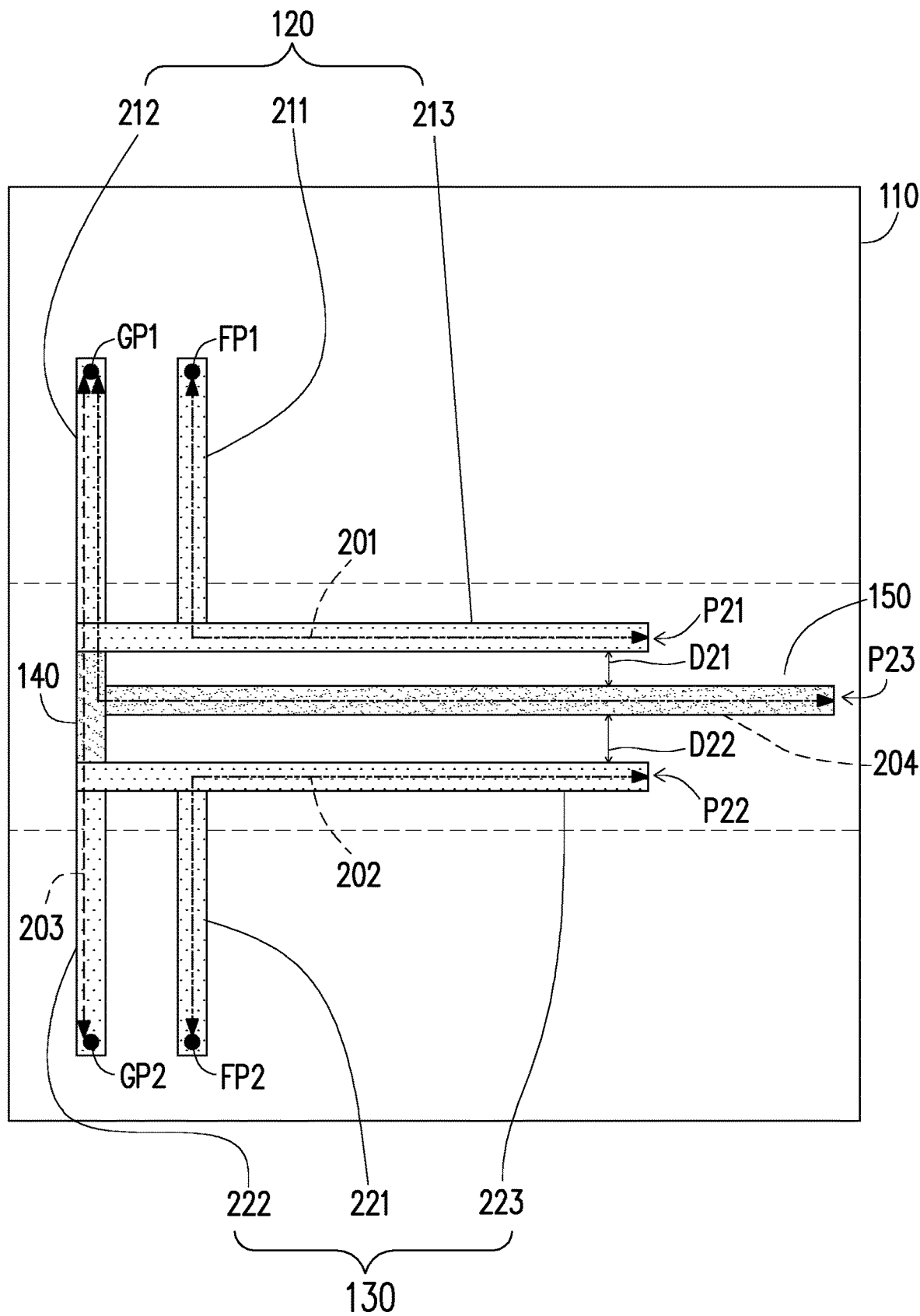
FIG. 2 is an expanded schematic diagram illustrating the mobile device depicted in FIG. 1.

FIG. 2 is an expanded schematic diagram illustrating the mobile device depicted in FIG. 1, and FIG. 2 illustrates the first antenna 120, the second antenna 130, the connection element 140, and the extension element 150 which are expanded on the carrying element 110. Referring to FIG. 2, the first antenna 120 has a first feeding point FP1, a first ground point GP1 and a first open-circuit terminal P21, and the first antenna 120 may operate in a first frequency band (for example, a WiFi frequency band) through a first resonance path 201 extending from the first feeding point FP1 to the first open-circuit terminal P21. The second antenna 130 has a second feeding point FP2, a second ground point GP2 and a second open-circuit terminal P22, and the second antenna 130 may operate in the first frequency band (e.g., the WiFi frequency band) through a second resonance path 202 extending from the second feeding point FP2 to the second open-circuit terminal P22.

The connection element 140 is electrically connected to the first antenna 120 and the second antenna 130. The connection element 140, the first antenna 120 and the second antenna 130 form a connection path 203 extending from the first ground point GP1 to the second ground point GP2, and the connection path 203, the first resonance path 201 and the second resonance path 202 do not overlap one another. In other words, the connection element 140 is electrically connected to a section in the first antenna 120 that the first resonance path 201 does not pass through and is electrically connected to a section in the second antenna 130 that the second resonance path 202 does not pass through, thereby preventing radiation characteristics of the first antenna 120 and the second antenna 130 from being influenced. In addition, the extension element 150 is electrically connected to the connection element 140 and includes a third open-circuit terminal P23. The extension element 150, the connection element 140 and the first antenna 120 may form a third resonance path 204 extending from the first ground point GP1 to the third open-circuit terminal P23, and the first antenna 120 may operate in a second frequency band (for example, a GPS frequency band) through the third resonance path 204.

In other words, the mobile device 100 may support a 2×2 multi-input multi-output (MIMO) technique in the first frequency band with the first antenna 120 and the second antenna 130. Additionally, with the disposition of the connection element 140 and the extension element 150, the third resonance path may be further formed, such that the first antenna 120 may further be capable of operating in the second frequency band (e.g., the GPS frequency band). Furthermore, the extension element 150 may further be employed to improve impedance matching between the first antenna 120 and the second antenna 130 in the first frequency band (e.g., the WiFi frequency band), thereby increasing the radiation characteristics of the first antenna 120 and the second antenna 130 to enhance communication quality of the mobile device 100.

Figure 3:
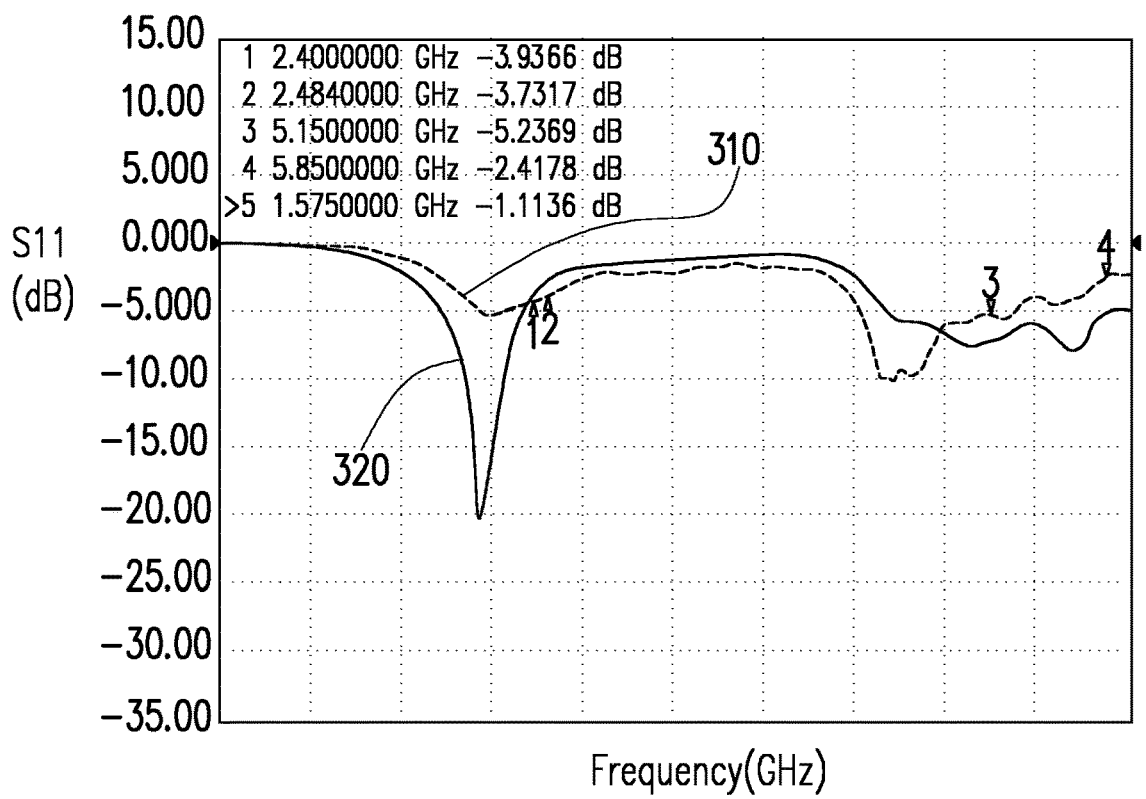
FIG. 3 and FIG. 4 are respectively graphs illustrating S-parameters of the first antenna and the second antenna in scenarios where the mobile device depicted in FIG. 1 is disposed with or without the connection element and the extension element.
Figure 4:
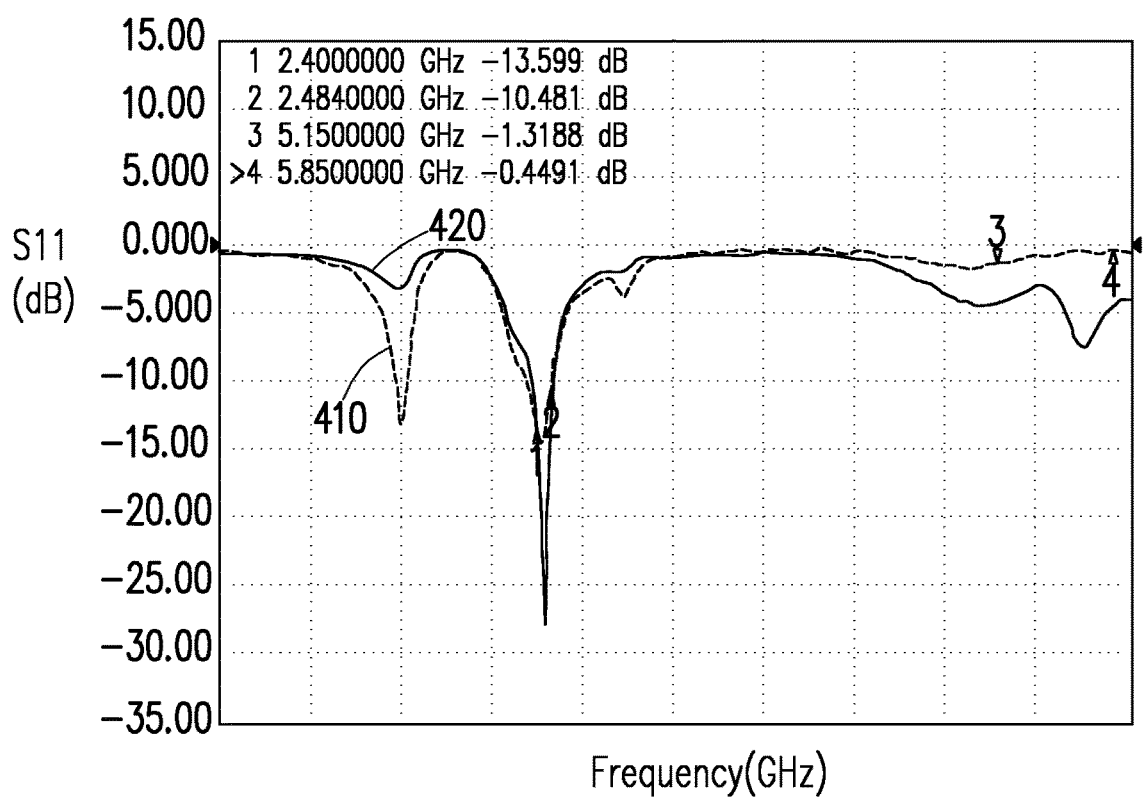

For example, FIG. 3 and FIG. 4 are graphs respectively illustrating S-parameters (S11) of the first antenna and the second antenna in scenarios where the mobile device depicted in FIG. 1 is disposed with or without the connection element and the extension element, wherein curves 310 and 320 are respectively used to represent the S-parameters of the first antenna 120 and the second antenna 130 in the scenario that the connection element 140 and the extension element 150 are not disposed, and curves 410 and 420 are respectively used to represent the S-parameters of the first antenna 120 and the second antenna 130 in the scenario that the connection element 140 and the extension element 150 are disposed.

Referring to the curve 310, in the scenario that the connection element 140 and the extension element 150 are not disposed, the first antenna 120 may operate only in the first frequency band (e.g., the WiFi frequency band). Referring to the curve 410, in the scenario that the connection element 140 and the extension element 150 are disposed, the first antenna 120, besides operating in the first frequency band, may further operate in the second frequency band (e.g., the GPS frequency band). By comparing FIG. 3 and FIG. 4 simultaneously, the extension element 150 may be employed to improve the impedance matching between the first antenna 120 and the second antenna 130 in the first frequency band, which may contribute to enhancing the communication quality of the mobile device 100 in the first frequency band. Additionally, in the scenario that the connection element 140 and the extension element 150 are disposed, a radiation efficiency of the first antenna 120 and the second antenna 130 in the first frequency band is about 40% or more, a radiation efficiency of the first antenna 120 in the second frequency band is about 50% or more.

For people having ordinary skill in the art to better understand the invention, detailed structures of the first antenna 120, the second antenna 130, the connection element 140 and the extension element 150 and a substrate 160 will be described below with reference to FIG. 2. Referring to FIG. 2, the first antenna 120 may be, for example, an inverted-F antenna and include a first feeding portion 211, a first ground portion 212 and a first radiation portion 213. A first terminal of the first feeding portion 211 has the first feeding point FP1 to receive a feeding signal from a signal source (for example, a wireless transceiver) in the mobile device 100. A first terminal of the first ground portion 212 has the first ground point GP1 and is electrically connected to the ground plane 170 on the substrate 160. A first terminal of the first radiation portion 213 is electrically connected to a second terminal of the first ground portion 212, and a second terminal of the first radiation portion 213 is the first open-circuit terminal P21. Additionally, the first radiation portion 213 is electrically connected to a second terminal of the first feeding portion 211 and a first terminal of the connection element 140.

Furthermore, the first feeding portion 211 and the first ground portion 212 are parallel to each other and vertical to the first radiation portion 213. Shapes of the first feeding portion 211, the first ground portion 212 and the first radiation portion 213 may be respectively straight shapes. In operation, a part of the first radiation portion 213 and the first feeding portion 211 may form the first resonance path 201, thereby enabling the first antenna 120 to operate in the first frequency band (e.g., the WiFi frequency band). Therein, a length of the first resonance path 201 is ¼ of a wavelength of a lowest frequency of the first frequency band. On the other hand, the first ground portion 212, the first terminal of the first radiation portion 213, a part of the connection element 140 and the extension element 150 may form the third resonance path 204, thereby enabling the first antenna 120 to operate in the second frequency band (e.g., the GPS frequency band). Therein, a length of the third resonance path 204 is ¼ of a wavelength of a lowest frequency of the second frequency band.

The second antenna 130 may be, for example, another inverted-F antenna and include a second feeding portion 221, a second ground portion 222 and a second radiation portion 223. A first terminal of the second feeding portion 221 has the second feeding point FP2 to receive a feeding signal from another signal source in the mobile device 100. A first terminal of the second ground portion 222 has the second ground point GP2 and is electrically connected to the ground plane 170 on the substrate 160. A first terminal of the second radiation portion 223 is electrically connected to a second terminal of the second ground portion 222, and a second terminal of the second radiation portion 223 is the second open-circuit terminal P21. Additionally, the second radiation portion 223 is electrically connected to a second terminal of the second feeding portion 221 and a second terminal of the connection element 140.

Furthermore, the second feeding portion 221 and the second ground portion 222 are parallel to each other and vertical to the second radiation portion 223. Shapes of the second feeding portion 221, the second ground portion 222 and the second radiation portion 223 may be respectively straight shapes. In operation, the second feeding portion 221 and a part of the second radiation portion 223 may form the second resonance path 202, thereby enabling the second antenna 130 to operate in the first frequency band (e.g., the WiFi frequency band). Therein, a length of the second resonance path 202 is ¼ of a wavelength of the lowest frequency of the first frequency band.

In an overall disposition, the connection element 140 and the extension element 150 are disposed between the first radiation portion 213 and the second radiation portion 223. A spacing D21 between the extension element 150 and the first radiation portion 213 is smaller than a spacing D22 between the extension element 150 and the second radiation portion 223. In other words, the extension element 150 is adjacent to the first radiation portion 213 and far away from the second radiation portion 223. Additionally, the extension element 150, the first radiation portion 213 and the second radiation portion 223 extend in the same direction, and the extension element 150 and the connection element 140 are vertical to each other. The first ground portion 212, the first terminal of the first radiation portion 213, the connection element 140, the first terminal of the second radiation portion 223 and the second ground portion 222 may form the connection path 203. In addition, shapes of the connection element 140 and the extension element 150 may be straight shapes.

Figure 5:
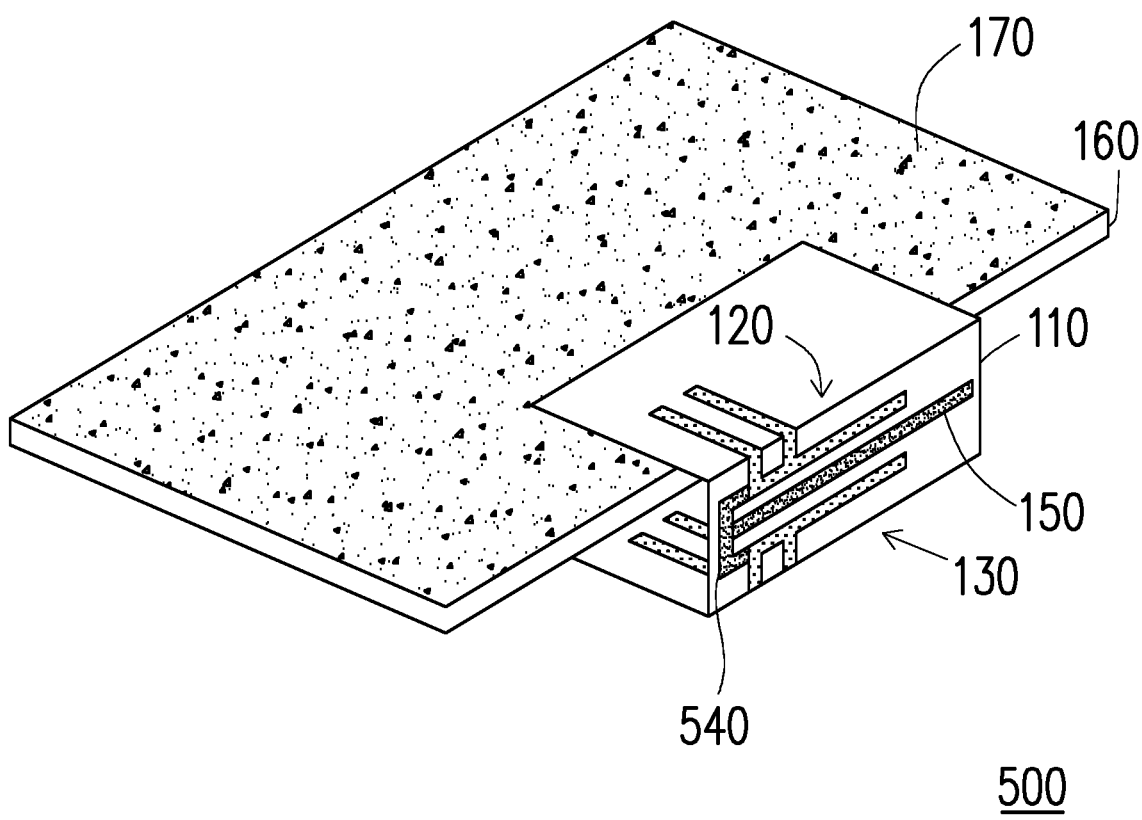
FIG. 5 is a schematic diagram illustrating a mobile device according to another embodiment of the invention.

Even though the shape of the connection element 140 is exemplarily illustrated in the embodiment above, it construes no limitations to the invention. People having ordinary skill in the art may change the shape of the connection element 140 to any geometric shape based on design demands. For example, FIG. 5 is a schematic diagram illustrating a mobile device according to another embodiment of the invention. In comparison with the embodiment illustrated in FIG. 1, a shape of a connection element 540 in a mobile device 500 illustrated in FIG. 5 is an inverted-U shape. Additionally, a first terminal of the connection element 540 is electrically connected to the first antenna 120, and a second terminal of the connection element 540 is electrically connected to the second antenna 130. The detailed disposition and operation of each element in the embodiment illustrated in FIG. 5 are included in the embodiment illustrated in FIG. 1 and thus, will not be repeatedly described.

Figure 6:
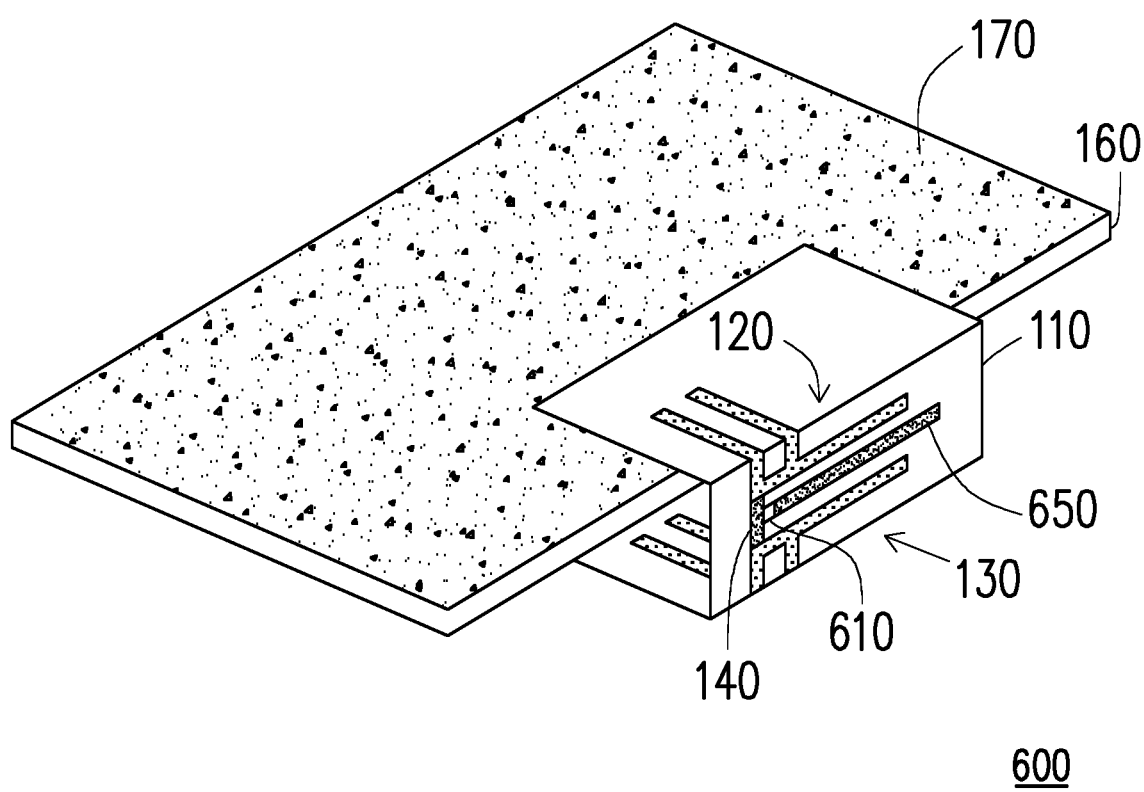
FIG. 6 is a schematic diagram illustrating a mobile device according to yet another embodiment of the invention.

It is to be mentioned that the connection element 140 and the extension element 150 illustrated in FIG. 1 may be further connected to each other through an inductor element, which contributes to reducing a length of the extension element 150. For example, FIG. 6 is a schematic diagram illustrating a mobile device according to yet another embodiment of the invention. In comparison with the embodiment illustrated in FIG. 1, a mobile device 600 illustrated in FIG. 6 further includes an inductor element 610. Additionally, a first terminal of an extension element 650 in the mobile device 600 is electrically connected to the connection element 140 through the inductor element 610, and a second terminal of the extension element 650 is the third open-circuit terminal. In operation, the extension element 650, the inductor element 610, the connection element 140 and the first antenna 120 may form the third resonance path extending from the first ground point GP1 of the first antenna 120 to the third open-circuit terminal, and the inductor element 610 may be employed to extend an equivalent length of the third resonance path, which contributes to reducing the length of the extension element 650. The detailed disposition and operation of each element in the embodiment illustrated in FIG. 6 are included in the embodiment illustrated in FIG. 1 and thus, will not be repeatedly described.

In light of the foregoing, the mobile device of the invention can operate in the first frequency band through the first antenna and the second antenna. In addition, the first antenna, with the connection element and the extension element, can form the third resonance path, so as to further operate in the second frequency band. Thereby, the mobile device can support the MIMO technique in the first frequency band, the extension element can be employed to improve the impedance matching between the first antenna and the second antenna, which can contribute to enhancing the communication quality of the mobile device.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:
1. A mobile device, comprising:
a carrying element;
a first antenna, disposed on the carrying element, having a first feeding point, a first ground point and a first open-circuit terminal and operating in a first frequency band through a first resonance path extending from the first feeding point to the first open-circuit terminal;
a second antenna, disposed on the carrying element, having a second feeding point, a second ground point and a second open-circuit terminal and operating in the first frequency band through a second resonance path extending from the second feeding point to the second open-circuit terminal;
a connection element, electrically connected to the first antenna and the second antenna, wherein the connection element, the first antenna and the second antenna form a connection path extending from the first ground point to the second ground point, and the connection path, the first resonance path and the second resonance path do not overlap one another; and
an extension element, electrically connected to the connection element and comprising a third open-circuit terminal, wherein the extension element, the connection element and the first antenna form a third resonance path extending from the first ground point to the third open-circuit terminal, and the first antenna operates in a second frequency band through the third resonance path, wherein a length of the third resonance path is ¼ of a wavelength of the second resonance frequency.

2. The mobile device according to claim 1, wherein the first antenna comprises:
a first feeding portion, having a first terminal having the first feeding point;
a first ground portion, having a first terminal having the first ground point; and a first radiation portion, having a first terminal electrically connected to a second terminal of the first ground portion and a second terminal being the first open-circuit terminal, and the first radiation portion being electrically connected to a second terminal of the first feeding portion and a first terminal of the connection element.

3. The mobile device according to claim 2, wherein the second antenna comprises:
a second feeding portion, having a first terminal having the second feeding point;
a second ground portion, having a first terminal having the second ground point; and
a second radiation portion, having a first terminal electrically connected to a second terminal of the second ground portion and a second terminal being the second open-circuit terminal, and the second radiation portion being electrically connected to a second terminal of the second feeding portion and a second terminal of the connection element.

4. The mobile device according to claim 3, wherein the connection element and the extension element are disposed between the first radiation portion and the second radiation portion.

5. The mobile device according to claim 4, wherein a spacing between the extension element and the first radiation portion is smaller than a spacing between the extension element and the second radiation portion.

6. The mobile device according to claim 1, wherein a first terminal of the extension element is electrically connected to the connection element through an inductor element, and a second terminal of the extension element is the third open-circuit terminal.

7. The mobile device according to claim 1, wherein a length of the first resonance path and a length of the second resonance path are respectively ¼ of a wave length of the first frequency band.

8. The mobile device according to claim 1, wherein the first antenna and the second antenna are respectively inverted-F antennas.

9. The mobile device according to claim 1, wherein the carrying element is formed by a plastic case of the mobile device.

* * * * *